Feb. 7, 1933.   R. P. SIMMONS   1,896,109
CUTTER HEAD FOR WELL DRILLS
Filed Feb. 3, 1930   4 Sheets-Sheet 1
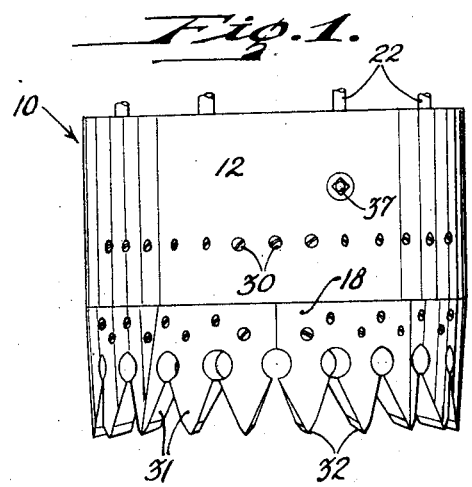
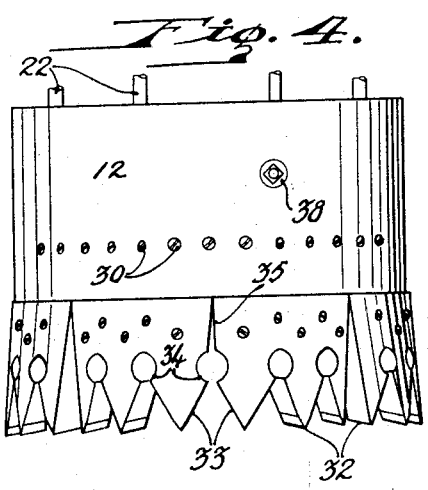
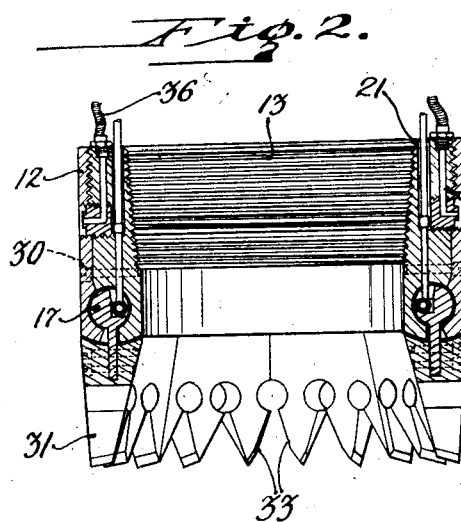
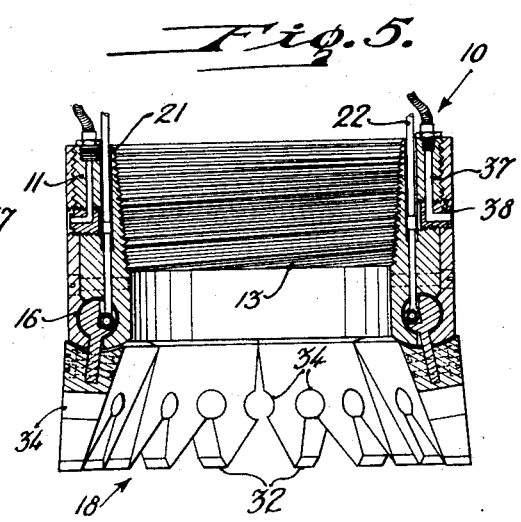
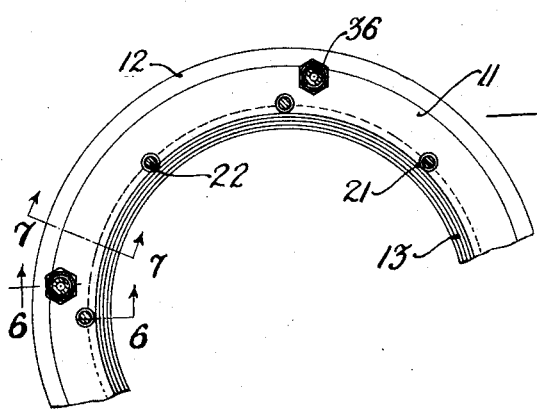
INVENTOR
RICHARD P. SIMMONS;
BY
Victor J. Evans,
ATTORNEY.

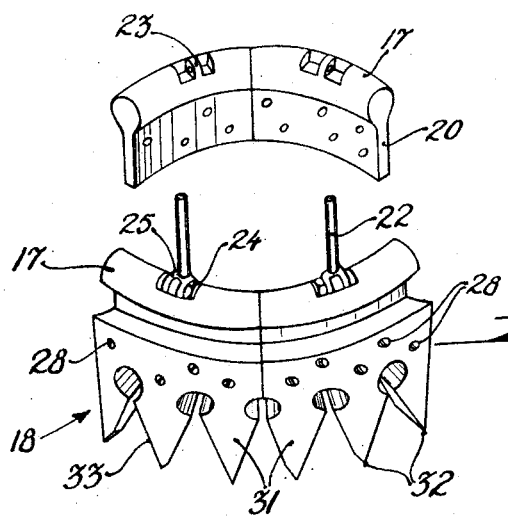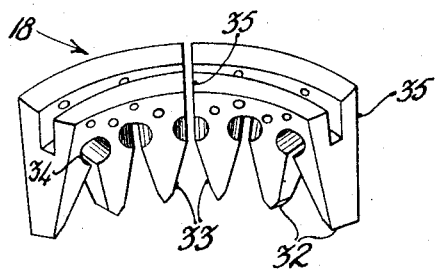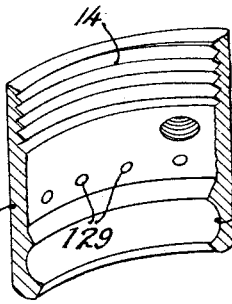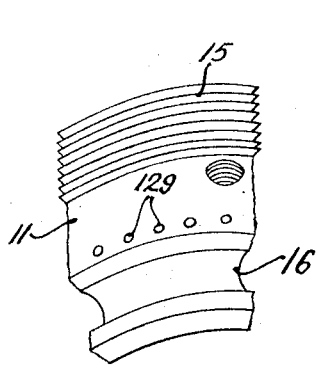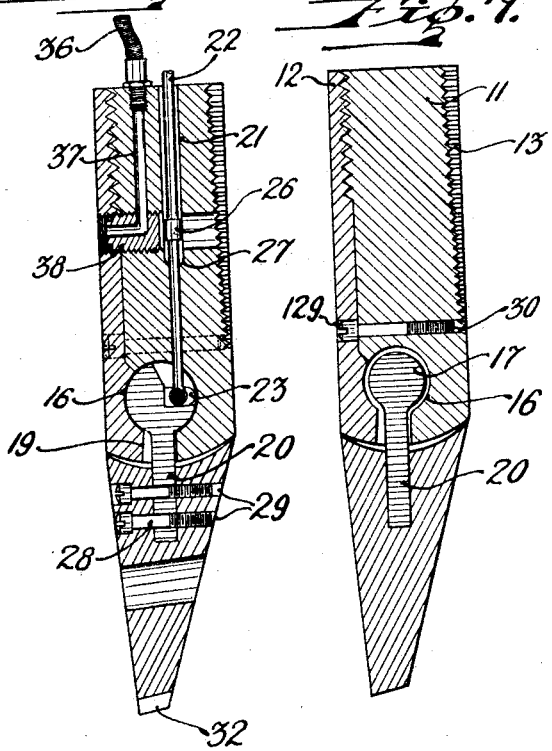

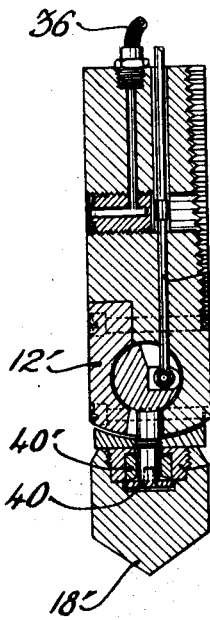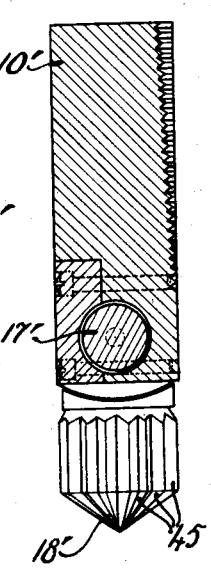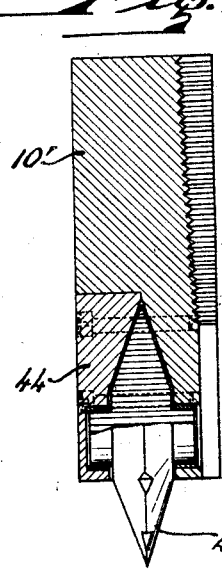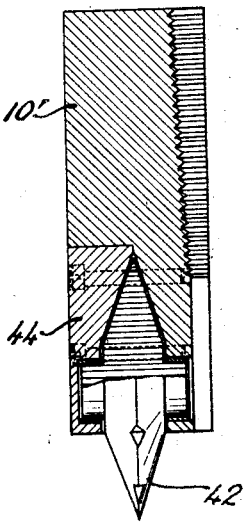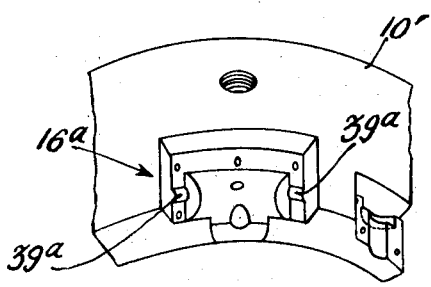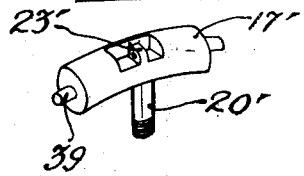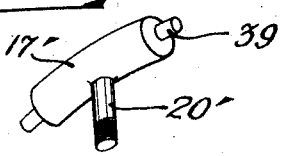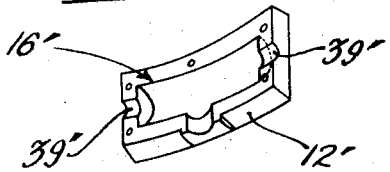

Patented Feb. 7, 1933

1,896,109

UNITED STATES PATENT OFFICE

RICHARD P. SIMMONS, OF NEW YORK, N. Y.

CUTTER HEAD FOR WELL DRILLS

Application filed February 3, 1930. Serial No. 425,643.

This invention relates to drilling apparatus and has particular reference to cutting heads therefor.

In the drilling of deep wells by various known methods, the standard practice frequently includes the sinking of a well casing, as the drilling progresses, to line the walls of the hole and prevent collapse thereof during drilling as well as subsequent thereto; though the well may also be provided with a lining or wall of cement or the like, to effectively resist corrosion, as shown, for instance in my copending application Serial No. 386,353 filed August 16, 1929.

The drilling may be accomplished by various percussive or rotary methods; but, however accomplished, the diameter of the well bore produced by the drill or cutter is less than the diameter required for the well casing. Hence, it is necessary to enlarge the bore produced by the drill or cutter to accommodate the casing or lining; and for this purpose various types of independent or separate underreaming means have been employed, as shown for instance, in my copending application Serial No. 401,447, filed October 22, 1929. In this latter application I disclose underreaming elements which are expansible beyond the circumferential limit of the bore as produced by the drill or cutter, whereby the bore is suitably enlarged to accommodate the casing, the expansion and retraction of the underreaming elements being controlled at will by means of externally accessible operating rods.

In my said application Serial No. 401,447, and also in other types of drills heretofore employed the underreaming is produced at a point some distance above the horizontal plane of the drill bit or cutter. To facilitate the drilling of the well it is desirable that the casing or lining be advanced as expeditiously as possible; and to this end I disclose in my co-pending application Serial No. 283,847, filed June 8, 1928, means whereby the underreaming for the casing takes place at the bottom of the hole in close proximity to the main cutting elements, whereby the underreaming for the casing takes place practically simultaneously with the drilling of the bore, the underreaming elements in the said application being effective during rotation of the cutter head in one direction, and ineffective during rotation of the cutter head in the opposite direction. This last mentioned construction includes, among its several advantages, the feature that underreaming and cutting elements, and the operating means for the underreaming elements, are all normally located so as not to extend substantially within the internal limit of the hollow cutter head. Such internal extension or retraction of the underreaming elements while not undesirable in cases where the underreaming is accomplished at some distance above the bottom of the hole, would be distinctly disadvantageous if the same existed at the plane of the main cutting elements or bits, due to the necessity for providing a core barrel or the like for trapping hard formation or receiving débris or cuttings of loose formations.

Furthermore, underreamers as heretofore employed have been more or less unsatisfactory for certain uses due to the fact that the expansion of said elements beyond the limits of the main bore has generally been in a plane at right angles to the longitudinal axis of the well bore, or at an upwardly inclined angle thereto. These latter arrangements have not enabled the underreaming elements to exert an efficient cutting action upon the wall of the bore, which action should desirably be commensurate with the cutting action exerted by the main cutters themselves, for uniform co-operation with the latter, thereby to uniformly advance the work.

The primary object of the present invention is to enable main cutting elements of the cutter head to act as underreaming elements, the main cutting elements being mounted to extend beneath the lower end of the cutter head, normally within the plane of the inner and outer walls of the cutter head, and certain or all of them being outwardly swingable at a downwardly inclined, efficient, cutting angle for underreaming purposes or for producing a bore of larger diameter than defined by the diameter of the cutter head itself.

Another object is to pivotally mount the swingable cutting elements at the lower part of the cutter head and to enable the cutting elements to be swung outward to different degree, and back to normal position, by means located within the wall of the cutter head and accessible for manipulation or operation from above ground.

A further object is to enable the cutting elements to be readily removable from their pivotal mountings, for purposes of replacement, resharpening or otherwise.

A still further object is to render the pivotal mountings for the cutting elements easily removable with or without the cutting elements themselves.

Yet another object is to provide a cutter head having angular cutting elements certain of which may be used for cutting a bore of the normal diameter while others may be simultaneously used for enlarging said normal diameter bore; whereby, also, a plurality of relatively narrow cutting elements may produce a relatively wide cut.

Still another object is to provide a plurality of cutting elements on a single pivotally mounted swingable unit, whereby to reduce the required number of operating rods or other operating means, the units being suitably spaced apart.

A still further object is to enable cutting elements to be movably mounted on their pivotal mountings, whereby different types of bits or cutters may be employed in accordance with the general concept of this invention, as for instance, rotary bits which may be of cylindrical, conical, angular or other form.

Other objects are to simplify and improve the construction of cutter heads, so that the same may be applied to the lower or head section of a rotatable casing, or to a drill head rotatable within the well casing, or to other parts of practically any type of drill, percussive, plunger, or rotary.

With the above indicated objects in view, and others which will hereinafter appear, the invention resides in certain novel constructions and combinations and arrangements of parts, clearly described in the following specification and fully illustrated in the accompanying drawings, which latter show embodiments of the invention as at present preferred.

In said drawings:

Fig. 1 is an elevational view of a drill head in which the bits are shown in a retracted position.

Fig. 2 is a vertical sectional view thereof.

Fig. 3 is a partial top plan view of the same.

Fig. 4 is a view like Fig. 1, but showing the bits in an extended position.

Fig. 5 is a vertical section taken centrally of Fig. 4.

Fig. 6 is a section on the line 6—6 of Fig. 3.

Fig. 7 is a sectional view on the line 7—7 of Fig. 3.

Fig. 8 is a fragmentary perspective view of the inner side of an outer section of a drill head.

Fig. 9 is a fragmentary perspective view of the outer side of an inner section of a drill head.

Fig. 10 is a perspective view of a pair of drill bits.

Fig. 11 is a perspective view of a pair of drill bits heads or pivotal mountings.

Fig. 12 is a perspective view of a pair of drill bit base or cutting portions, shown in spaced relation and removed from their pivotal mountings.

Fig. 19 is a section taken on the line 19—19 of Fig. 15.

Fig. 20 is a section taken on the line 20—20 of Fig. 15.

Fig. 21 is a section on the line 21—21 of Fig. 17.

Fig. 22 is a section on the line 22—22 of Fig. 15.

Fig. 23 is a fragmentary outside perspective of an inner section of the drill head shown in Fig. 19.

Fig. 24 is a perspective view of the inner side of a retaining plate, as used with the modified form of drill head shown in Figs. 13 to 26.

Fig. 25 is a perspective inside view of one of the pivotal mountings for the cutting bits shown in said modified form; and Fig. 26 is a perspective view of the opposite side of the pivotal mounting shown in Fig. 25.

Figure 13:
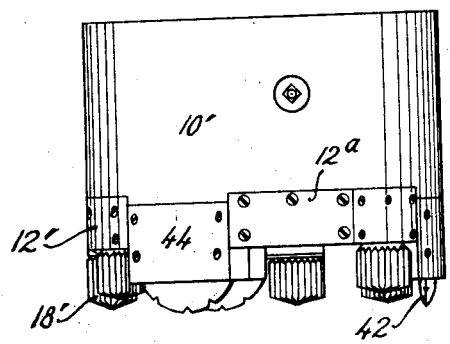
Fig. 13 is an elevational view of a modified form of drill head.

In the embodiment of the invention illustrated in Figs. 1 to 12 of the drawings, the numeral 10 designates the tubular wall of a drill or cutter head, within the hollow or open center of which portions of the drilling apparatus, such as an earth retracting device, (not shown) may be provided.

The cutter head 10 in this instance includes an inner section 11 and an outer section 12; and this cutter head is removably attachable to a core barrel, as for example by means of internal threads 13 on the section 11 which are adapted to co-act with mating threads provided on a reduced terminal portion of a core barrel, so that the outer surfaces of the said core barrel and the section 12 may be substantially flush. Internal threads 14 on the section 12 co-act with external threads 15 on the section 11 for attaching the said sections 12 and 11.

Transversely curved or arcuate recesses 16 are provided between the sections 11 and 12 for accommodating the head portions or pivotal mountings 17 provided for the drill bit or cutting units 18. Slots 19 communicate with the recesses 16; and these slots 19 extend downwardly to the exterior of the cutter head, to receive the necks 20 of the pivotal mountings 17 of the cutting units 18, the outer walls of these slots 19 preferably extending at a diverging angle. Communicating also with the recesses 16 are vertical bores or passages 21, in which rods 22 are reciprocable for swinging the cutting devices, there being an ear 23 on each pivotal mounting 17, to which said rods are hingedly attached by means of pins 24 or like instrumentalities. The rods 22 are preferably bifurcated as seen at 25 to receive the ears 23, the bifurcations having apertures therein to receive the pins 24.

In this instance each rod 22 includes a plurality of coupled sections. As seen in Figs. 2, 5 and 6 the sections are united by a collar 26, each collar providing a stop for its rod to limit the swinging movement of each cutting unit 18, the wall of the passage 21 in the cutter head 10 being stepped at 27 between the lower or restricted portion of the respective passage 21 and the upper enlarged diameter portion thereof. The opposed walls of the slots 19, with which the necks 20 are adapted to contact, also form stops for limiting the movements of the cutting units. Fastening elements 28 secure the necks 20 in the base portions of the cutting units 18, there being apertures 29 in the latter to receive said fastening elements; and fastening elements 30 secure the threaded inner and outer sections 11 and 12 of the cutter head 10 in place against relative rotation, these latter fastenings 30 being provided to extend through aligned apertures 129 of the sections 11 and 12.

Each cutting unit 18 is preferably provided with a plurality of terminals 31 which are formed between the ends 32. These edges 33 are continuous with edges which bound openings 34 in the units 18, the openings 34 being formed between each pair of terminals 31, and also between each pair of units 18. Continuous with the outer edges of the terminal portions 31 of each cutting unit, are edges which extend to the top of the base portions of the cutting units, at the cutter head 10. The openings 34 tend to facilitate movement of débris or excavated matter from one side of the base portions of the units 18 to the other. To insure freedom of movement of the pivotal mountings 17 in their recesses, during turning movement, the heads of said pivotal mountings are preferably tapered slightly towards their opposite ends.

An important feature of the present construction resides in the fact that the rods 22 may be omitted entirely, if desired so that the cutting units 18 will be freely movable inwardly and outwardly during the percussive or chopping action of the cutter head 10, thus rendering the cutter head particularly efficient when working in more or less loose formations. The angularity of the cutting elements tends to force the cutters outward as the cutter head descends, causing the cutting or chopping action to be effective over a considerably wider area than when the cutting units are secured in a fixed position, whether the latter be vertical or inclined.

Furthermore, the omission of the rods 22 enables the cutter unit mountings 17 to have a free movement in the annular groove or recess 16 so that even though the cutter head may be reciprocated without itself rotating, the cutter units will be capable of a free rotative movement relative to the cutter head, thus contributing to the drilling efficiency of the cutter head, as will be understood.

One disadvantage of prior constructions is that it has been necessary to plaster the wall of the bore with mud or the like during the drilling, to support the wall and prevent the same from caving in against the drill tools before the well casing has been extended. Such plastering with mud or the like is disadvantageous for reasons well known in the art; and to obviate the same it is a further object of my invention to support the wall of the well bore between the outer circumferential plane of the well casing and the main bore by means of pressure fluid, as for instance compressed air, which I admit to the well bore at any desired point. The establishment and maintenance of such pressure condition supports the wall and effectually prevents caving in of the ground until the casing has been extended, it being understood that the area under such pressure will only extend from the upper terminus of the casing, where the bore may be sealed, to the bottom of the hole being drilled. In the present application I illustrate one preferred manner in which the foregoing results are accomplished.

A suitable conduit 36, supplies air under pressure to the exterior of the cutter head 10, to support the earth, or any loose portions thereof, against collapse, during the drilling operation. or for other purposes, it being understood that a space may exist, to receive the well casing or lining between the bottom of the latter and the surface being drilled. This conduit in the present instance connects with a duct or passage 37, formed in the cutter head 10, the duct 37 being continued to the outer surface through a threaded insertion plug 38, provided in the outer wall of the cutter head. Any desired number of conduits 36 may be used.

Figure 16:
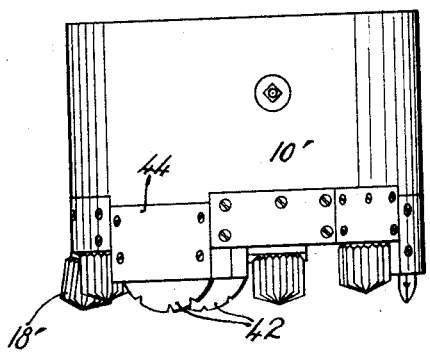
Fig. 16 is a view like Fig. 13, but showing some of the drill bits in extended positions.
Figure 14:
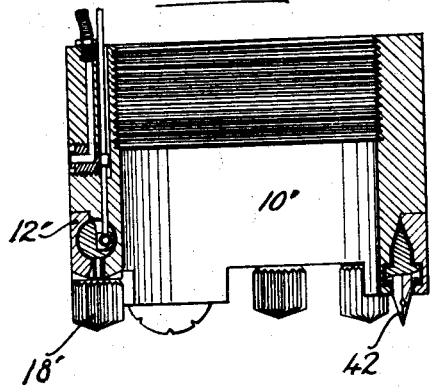
Fig. 14 is a vertical section taken centrally of Fig. 13.
Figure 18:
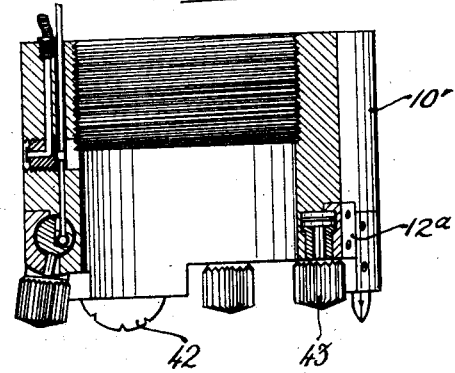
Fig. 18 is a sectional view taken on the line 18—18 of Fig. 17.
Figure 15:
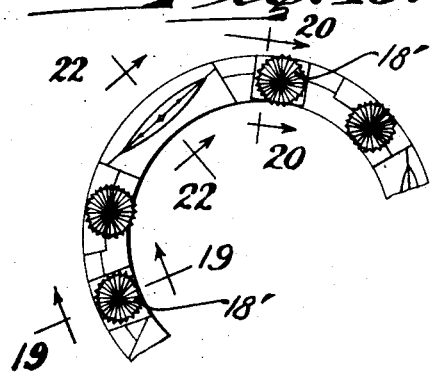
Fig. 15 is a fragmentary bottom plan view of the drill head shown in Fig. 13.
Figure 17:
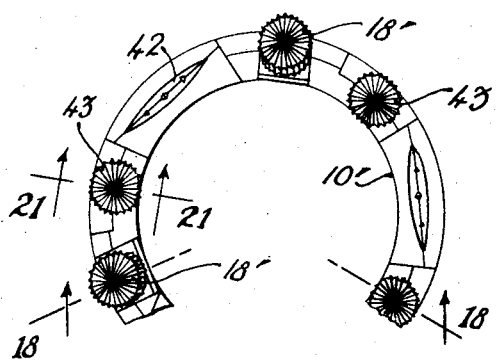
Fig. 17 is a fragmentary bottom plan view of Fig. 16.

In the modified structure shown in Fig. 13 to 26, the cutter head 10' carries positively controllable, directly inwardly and outwardly swingable cutting units in the form of rotary bits 18', for cutting earth or the like, to provide a bore of greater diameter than that of the said cutter head 10'. Each of these bits 18' is provided with a pivotal mounting 17' and a neck or stem 20'. This pivotal mounting is formed with terminal trunnions 39, mounted and turnable in substantially the same manner as in the case of the cutting units 18, there being an operating rod 22' and an ear 23' for that purpose. In this instance, however, the stem 20' has a stop plate 40, at its lower end. A revolvable retaining collar 40' is provided on said stem 20' above the stop plate 40; and this collar 40' and the stop plate 40, are operatively connected to the cutting unit 18' by means of bushing 41.

Notched disks 42 provided between the cutting units 18' are adapted to cut a central groove in the surface being drilled, and a fixed rotary bit 43 is effective to cut a wider groove along said central groove in the drilled surface, which wider groove extends slightly internally of the plane of the inner surface of the cutter head 10'. Outer subsections 12' and 12ª hold the respective cutting units 18' and 43 in position, while outer subsections 44 are effective to hold the cutting disks 42 in place. A plurality of these disks 42 and cutting units 18' and 43 are provided, as may be found desirable.

Each subsection 12' or retaining plate is internally formed with a suitable recess 16' to receive one side of the pivotal mounting 17', and each inner section of the cutter head 10' is formed with a mating recess 16ª to receive the opposite side of the pivotal mounting 17'. The end portions of the recesses 16' and 16ª are formed to accommodate the trunnions 39, as indicated at 39' and 39a. Each of the rotary cutting units 18' includes a plurality of cutting bit edges or elements 45.

As the cutting elements shown and described in Figs. 1 to 12 inclusive are particularly adapted for percussive or chisselling action, the drill cutter head may also be made rectangular or square instead of circular in cross section, in which case the opposed walls of the cutter head may terminate in different upper and lower planes, so that the cuts or excavations formed by the cutting elements of the opposed walls may terminally intersect, or meet, to completely detach the central core from the side walls of the bore.

For the rectangular structure, the bits will, of course, be straight, rather than arcuate, as illustrated. The rectangular structure will be found advantageous for drilling shafts for elevators, highways or the like, in which angular structures of various kinds, rather than annular tubes, are installed.

The hereinbefore described constructions admit of considerable modification without departing from the invention; therefore, it is the wish not to be limited to the precise arrangements shown and described, which are as aforesaid, by way of illustration merely. In other words, the scope of protection contemplated is to be taken solely from the appended claims, interpreted as broadly as is consistent with the prior art.

What I claim as new, is:

1. A drilling device including a hollow tubular cutter head having recesses therein, cutting units movably mounted in said recesses, a plurality of cutting terminals on each of said cutting units, said units being swingable directly outwardly to position the same beyond the normal plane of said cutter head, and elongated control elements for swinging said units.

2. A drilling device including co-acting outer and inner head sections, said sections having recesses therebetween, swingable bit units normally disposed within the plane of said sections and beneath the same, said units including portions movable in said recesses, cutting elements rigidly associated with said movable portions, and elongated actuators attached to said movable portions for swinging the latter and hence said cutting elements directly outwardly beyond the normal plane of said outer head section.

3. A drill device including a cutter head having recesses therein and bores communicating with said recesses, cutting elements including portions turnably mounted in said recesses and swingable inwardly and outwardly, and elongate members guided in said bores, said members attached to said turnably mounted portions and adapted to swing said cutting units to selected operative positions.

4. A drill head including a wall having recesses therein, cutting units turnably mounted in said recesses and normally disposed in the plane of said wall and beneath the latter, said cutting units swingable outwardly to position the same beyond the plane of said wall, said wall having bores communicating with said recesses, rods guided in said bores and operatively connected to said units for turning the latter outwardly, and stops on said rods adapted to contact with portions of said wall to arrest the outward swinging movement of said cutting units.

5. In a drilling apparatus a cutter head including a reciprocable rod, said rod having bifurcated terminals, said terminals having apertures therein, and a cutting unit at the base of said cutter head, said unit including a turnable mounting having a laterally disposed apertured ear, said cutting unit rigid with its mounting and including a plurality of cutting elements, and a pin disposed in the apertures of said ear and bifurcated terminals, whereby movement of said rod is effective to turn said mounting and swing said cutting unit outward beyond the normal plane of said cutter head.

6. In a drill head, a wall portion having a rod reciprocable therein, said wall having a bore for said rod, said wall having an elongated recess in communication with said said bore, and said rod including perforated bifurcated terminals; a cutting unit including an elongated mounting having a lateral perforated ear thereon, a swingable cutting terminal rigid with said elongated mounting, and extending downwardly beneath the drill head, said mounting turnable on its longitudinal axis, in said recess, and a pin disposed in the perforations of said bifurcated terminals and of said ear, whereby movement of said rod is effective to swing said cutting terminal outwardly to a plane beyond the base of said wall and at an inclination to the longitudinal axis of said drill head.

7. In a drill head, a wall portion having rods reciprocable therein, said wall including bores for said rods and elongated recesses to communicate with said bores, said rods including perforated terminals; cutting units at the base of said drill head, said units including swingable mountings, lateral perforated ears on said mountings, said cutting units rigid with said swingable mountings, said mountings turnable on their longitudinal axes, and pins disposed in the perforations of said terminals and ears, whereby movement of said rods is effective to swing said cutting units outwardly beyond the plane of said wall portion.

8. A drilling device including a hollow tubular cutter head having an internal circumferential recess therein, and cutting units mounted in said recess and provided with means for adjustment angularly of said cutter head.

9. Cutting means for drilling wells comprising a circular series of cutting elements in end to end relation, a tubular body, means for mounting the cutting elements on the tubular body, and means operable from a remote point of control for swinging the cutting elements in circular formation outwardly of the tubular body to cut a path larger than the tubular body.

10. Cutting means for drilling wells comprising a tubular body having a curved end face, a series of cutting elements formed with corresponding end faces, ball members mounted for turning in the tubular body and connected to the cutting elements, and means operable for turning the ball members to swing the cutting elements outwardly of the tubular body and for withdrawing the cutting elements inwardly of the outermost position.

11. A well drilling device comprising an annular carrying member, and cutters mounted at the lower end of the carrying member, the latter having air ports opening on its outer periphery just above the horizontal plane of the cutters and being provided with air ducts communicating with said ports and adapted for connection with a compressed air supply source.

12. A cutter head for well drilling comprising a carrying member, a series of cutters of which each is swingingly mounted on the lower end of the carrying member and is in the form of a sector of a ring and provided with cutting teeth on its lower edge, said cutters in their innermost positions being in end to end relation to form a ring, and actuating means for the cutters to swing them beyond the outer periphery of the carrying member to enlarge the bore of the well being drilled.

13. A cutter head for well drilling comprising a carrying member, a series of cutters of which each is swingingly mounted on the lower end of the carrying member and is in the form of a sector of a ring and provided with cutting teeth on its lower edge, said cutters in their innermost positions being in end to end relation to form a ring, and actuating means for the cutters to swing them beyond the outer periphery of the carrying member to enlarge the bore of the well being drilled, said cutters having their axes of swinging movement in angularly related vertical planes.

14. A cutter head for well drilling comprising a carrying member, a series of cutters of which each is swingingly mounted on the lower end of the carrying member and is in the form of a sector of a ring and provided with cutting teeth on its lower edge, said cutters in their innermost positions being in end to end relation to form a ring, and actuating means for the cutters to swing them beyond the outer periphery of the carrying member to enlarge the bore of the well being drilled, said cutters having their axes of swinging movement in angularly related vertical planes but in a common horizontal plane.

In testimony whereof I hereby affix my signature.

RICHARD P. SIMMONS.